US012616088B2

(12) United States Patent
    Lundkvist

(10) Patent No.: US 12,616,088 B2
(45) Date of Patent: May 5, 2026

(54) NAVIGATING A ROBOTIC MOWER ALONG A GUIDE WIRE

(71) Applicant: Globe (Jiangsu) Co., Ltd., Changzhou (CN)

(72) Inventor: André Lundkvist, Habo (SE)

(73) Assignee: Globe (Jiangsu) Co., Ltd., Changzhou (CN)

( * ) Notice: Subject to any disclaimer, the term of this patent is extended or adjusted under 35 U.S.C. 154(b) by 735 days.

(21) Appl. No.: 18/061,992

(22) Filed: Dec. 5, 2022

(65) Prior Publication Data

US 2023/0094888 A1      Mar. 30, 2023

Related U.S. Application Data

(63) Continuation of application No. PCT/CN2020/106138, filed on Jul. 31, 2020.

(51) Int. Cl.
*A01D 34/00* (2006.01)
*G05D 1/00* (2006.01)
*A01D 101/00* (2006.01)

(52) U.S. Cl.
CPC ......... *A01D 34/008* (2013.01); *G05D 1/0225* (2013.01); *G05D 1/0263* (2013.01); *G05D 1/0265* (2013.01); *A01D 2101/00* (2013.01)

(58) Field of Classification Search
CPC ............. A01D 34/008; A01D 2101/00; G05D 1/0225; G05D 1/0263; G05D 1/0265; Y02T 10/70
See application file for complete search history.

(56) References Cited

U.S. PATENT DOCUMENTS

| | | | | |
|---|---|---|---|---|
| 2012/0029752 A1* | 2/2012 | Johnson | ................. | G05D 1/027 |
| | | | | 901/1 |
| 2012/0029753 A1* | 2/2012 | Johnson | .............. | B60L 15/2036 |
| | | | | 701/23 |
| 2012/0029754 A1* | 2/2012 | Thompson | ........... | A01D 34/006 |
| | | | | 901/1 |
| 2012/0029756 A1* | 2/2012 | Johnson | .............. | G05D 1/0265 |
| | | | | 701/26 |
| 2014/0012418 A1* | 1/2014 | Johnson | .............. | G05D 1/0265 |
| | | | | 700/258 |
| 2014/0379196 A1* | 12/2014 | Da Rocha | ................. | B60L 3/12 |
| | | | | 901/1 |
| 2015/0373906 A1* | 12/2015 | Jägenstedt | .............. | B60L 50/52 |
| | | | | 901/1 |

(Continued)

FOREIGN PATENT DOCUMENTS

| | | | | |
|---|---|---|---|---|
| CN | 105009014 A | 10/2015 | | |
| CN | 106576570 A | * 4/2017 | ........... | A01D 34/008 |

(Continued)

*Primary Examiner* — Peter D Nolan
*Assistant Examiner* — Peter Y Ning

(57) ABSTRACT

A method navigates a robotic mower (2) by means of a wire (8). The robotic mower (2) comprises at least two sensors (12; 14). The method comprises detecting (S101), by means of the at least two sensors (12, 14), at least one signal from the wire (4a; 8; 10), measuring (S102) a polarity of the at least one signal of the wire (4a; 8; 10) by means of each one of the at least two sensors (12, 14), determining (S103) a direction based on the polarities measured by means of the at least two sensors (12, 14) and turning (S104) the robotic mower (2) towards the determined direction.

19 Claims, 7 Drawing Sheets

(56) References Cited

U.S. PATENT DOCUMENTS

| 2018/0199506 A1* | 7/2018 | Ito | A01D 34/008 |
| 2020/0137951 A1* | 5/2020 | Liljedahl | A01D 34/008 |
| 2020/0401146 A1* | 12/2020 | Strandberg | G05D 1/0219 |
| 2021/0037703 A1* | 2/2021 | Holgersson | G05D 1/648 |

FOREIGN PATENT DOCUMENTS

| EP | 2684438 A1 | 1/2014 | | |
| EP | 3073602 A1 | 9/2016 | | |
| WO | WO-2018010650 A1 * | 1/2018 | | G05D 1/02 |
| WO | 2018/182478 A1 | 10/2018 | | |

* cited by examiner

Control unit 22

Processor 80

Memory 82

Computer program 84

Interface 86

Signal generator 6

Processor 60

Memory 62

Computer program 64

Interface 66

NAVIGATING A ROBOTIC MOWER ALONG A GUIDE WIRE

CROSS-REFERENCE TO RELATED APPLICATIONS

The present application is a continuation application of PCT application filing PCT/CN2020/106138 filed on Jul. 31, 2020. All the above are hereby incorporated by reference, including any appendices or attachments thereof, for all purposes.

TECHNICAL FIELD

The present invention generally relates to a method for navigating a robotic mower along a signal wire, e.g., back to a charging station when a battery of the robotic mower needs to be recharged.

BACKGROUND ART

Robotic mowers, also called self-propelled lawnmowers, are generally known. These robotic mowers are provided with a rechargeable battery. When the remaining power in the battery is below a certain level the robotic mower is programmed to return to the charging station to recharge the battery. There are different possibilities for returning the robotic mower to the charging station. One possible method is that the robotic mower, upon a command to return to the charging station, continues its movement until a boundary wire is detected nearby and then follows the boundary wire to the charging station that is provided somewhere along the boundary wire.

Another option when returning to the charging station is to use a guide wire, which the robotic mower follows back to the charging station. The use of a guide wire often enables a shorter and faster way back to the charging station compared to following the boundary wire. The guide wire can also be beneficial to use when the robotic mower needs to navigate through a narrow passage.

A common approach is to use a signal level of a signal source, such as the guide wire, boundary wire or a signal emitted at the position of the charging station. However, the signal level usually depends on the length of the corresponding wire, and this may be different in different sites, such as smaller or larger gardens. Further, the signal level can be different depending on whether a user decides to route the wire on the surface of the ground or bury it under the surface, and on weather conditions. This may increase the time the robotic mower needs in order to find the charging station. As a result, the mower usually needs to reserve a substantial portion of the battery capacity for the search and navigation towards the charging station.

SUMMARY

An object of the present invention is to provide a reliable and efficient solution for navigating a robotic mower by means of a wire.

According to an aspect of the present invention this object is achieved by a method for navigating a robotic mower by means of a wire, e.g., for returning the robotic mower to a charging station when the robotic mower needs to be recharged. Therein, the robotic mower comprises at least two sensors. The method comprises detecting, by means of the at least one sensor, at least one signal from the wire. The method further comprises detecting, by means of the at least two sensors, at least one signal from the wire, measuring a polarity of the at least one signal of the wire by means of each one of the at least two sensors, determining a direction based on the polarities measured by means each of the at least two sensors and turning the robotic mower towards the determined direction.

This is based on the idea to use a polarity of a signal of the wire instead of the strength of the signal. The wire forms a part of an electric circuit. A current through the wire creates a magnetic field around the wire. The sensors are adapted to measure this magnetic field. For example, the sensors are magnetic field sensors. Accordingly, on one side of the wire, the sensors detect an opposite polarity (e.g., upwards or downwards) compared to the other side of the wire (e.g., downwards or upwards, respectively). By measuring the polarity and knowing the direction of the current flow, the mower can thus reliably detect on which side of the wire the measuring sensor is located. The at least two sensors are spaced apart from one another. When the two sensors measure the same polarities, they are both on the same side of the wire. There are four different possibilities (++, −−, +− and −+) of combinations of polarities. The charging station is located on a known section of the wire, so the mower may immediately deduce from the two measured polarities whether it is located on the wire in the direction of the charging station or not. The guide wire leads to the charging station, and a predetermined combination of polarities measured by the at least two sensors (e.g., +−) indicates the correct direction.

In an exemplary embodiment, turning the robotic mower towards the determined direction comprises rotating the robotic mower with respect to the wire such that one of the at least two sensors is located above (in particular, straight above) the wire. This allows to very efficiently and reliably follow the wire.

In an exemplary embodiment, turning the robotic mower towards the determined direction comprises rotating the robotic mower with respect to the wire until one of the at least two sensors detect a change of the polarity of the at least one signal of the wire. Directly above the wire, the corresponding sensor, depending on the type of sensor, may detect a laterally pointing magnetic field, or it may detect that the polarity flips with very small movements of the robotic mower.

In another exemplary embodiment, turning the robotic mower towards the determined direction comprises rotating the robotic mower with respect to the wire until the at least two sensors detect the at least one signal of the wire with opposite polarity. In this manner the robotic mover may deduce that it is oriented substantially parallel to the wire when the wire a routed straight under the mower.

In an embodiment, the method further comprises crossing the wire by a predetermined crossing distance before measuring the polarity of the at least one signal of the wire by means of each one of the at least two sensors. This may facilitate an alignment with the wire.

In an embodiment, the wire is a guide wire arranged within an area delimited by a boundary wire. For example, the guide wire is electrically connected to a contact at the charging station with one end of the guide wire. Another end of the guide wire may be electrically connected to the boundary wire. Hence, the robotic mower may be aligned with the guide wire in a particularly efficient, quick and robust manner.

According to an alternative embodiment, the wire is a wire loop, e.g., arranged at (e.g., under) a charging station plate of a charging station. In this way, the robotic mower may determine particularly easily and robust whether it is oriented towards charging connectors of the charging station.

The above object is also achieved by a method for guiding a robotic mower along a wire to a predetermined position, said robotic mower comprising at least one sensor, the method comprising navigating the robotic mower, by means of the at least one sensor detecting at least one signal of the wire, such that the at least one sensor is located above the wire and controlling the robotic mower to straddle along the wire towards the predetermined position using a polarity of at least one signal of the wire measured by means of the at least one sensor.

This is based on the idea to use the polarity of a signal of the wire instead of the strength of the signal to efficiently, quickly and robustly guide the robotic mower along the wire towards the predetermined position, e.g. the position of a charging station.

Optionally, the step of navigating the robotic mower by means of the at least one sensor is performed in accordance with the method for navigating a robotic mower described above. This is a particularly efficient combination, because after determining the right direction, the mower can directly straddle along the wire in one smooth and quick process without the need of time-consuming signal level searches.

According to an embodiment, the method further comprises detecting, by means of the at least one sensor, that the robotic mower has entered a wire loop by measuring a polarity of at least one signal of the wire loop, and detecting a change of the polarity of the at least one signal of the wire loop. In this manner the robotic mower can reliably detect that it is arranged inside or outside the wire loop, e.g., in order to determine its current position.

Optionally, the method further comprises, in response to detecting that the robotic mower has entered the wire loop, controlling the robotic mower to drive straight forward for a predetermined distance, e.g., 10 cm, 50 cm, or a value in between. The robotic mower does not need to receive any signal for this movement According to an embodiment, the wire loop is a first wire loop and a second wire loop is provided (e.g., arranged at least partially inside the first wire loop), and the method further comprises, in response to detecting that the robotic mower has entered the first wire loop, detecting, by means of the at least one sensor, that the robotic mower has entered the second wire loop by measuring a polarity of at least one signal of the second wire loop.

According to an embodiment, the robotic mower comprises at least two sensors and the method further comprises, in response to detecting that the robotic mower has entered the second wire loop, turning the robotic mower such that the at least two sensors are both located inside or both located outside of the second wire loop, and, in response to assuming this arrangement, controlling the robotic mower to drive straight forward, e.g., until at least one of the sensors detects a change of the measured polarity of the signal of the second wire loop, or until charging connectors of the robotic mower make electric contact with charging connectors of the charging station.

According to an embodiment, the second wire loop is a portion of, or electrically connected with, a boundary wire delimiting an area. The second wire loop may be arranged at, e.g., attached to, a plate of the charging station.

Optionally, the wire is a guide wire arranged within the area delimited by the boundary wire.

According to another aspect the above object is achieved by a robotic mower comprising at least two sensors, and adapted to: detect, by means of the at least two sensors, at least one signal from a wire, measure a polarity of the at least one signal of the wire by means of each one of the at least two sensors, determine a direction based on the polarities measured by means of the at least two sensors and turn towards the determined direction.

According to another aspect the above object is achieved by a robotic mower comprising at least one sensor, and adapted to: navigate, by means of the at least one sensor detecting at least one signal of a wire, such that the at least one sensor is located above the wire and straddle along the wire towards the predetermined position using a polarity of at least one signal of the wire measured by means of the at least one sensor.

Optionally, the robotic mower according to any aspect is further adapted to perform the method according to any aspect or embodiment described herein.

According to an aspect, a system comprising a wire and the robotic mower according to any aspect or embodiment described herein is provided. Therein, the wire may be a guide wire arranged within an area delimited by a boundary wire.

By this, a method and robotic mower for navigating the robotic mower by means of a wire are provided that allow to reliably and efficiently navigate the robotic mower by means of a wire.

BRIEF DESCRIPTION OF DRAWINGS

The invention is now described, by way of example, with reference to the accompanying drawings, in which.

DESCRIPTION OF EMBODIMENTS

In the following, a detailed description of exemplary embodiments for navigating a robotic mower by means of a wire according to the present disclosure will be presented.

Figure 1:
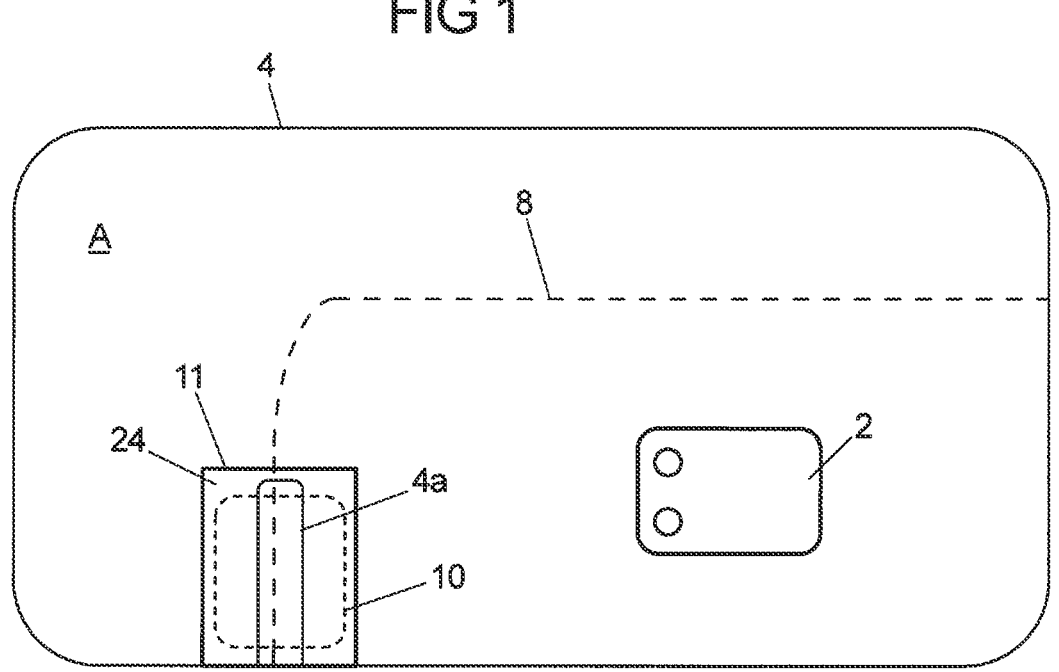
FIG. 1 is a schematic view of a robotic mower system.

FIG. 1 shows a schematic overview of a system for performing the method of embodiments for navigating a robotic mower 2 by means of a guide wire 8, in particular towards a predetermined position, such as a charging station 11. The robotic mower 2, or as it also may be called a self-propelling lawnmower, is battery powered and needs to be recharged at regular intervals. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provided on or above the ground. The boundary wire 4 could be an ordinary copper wire of single-core type. There are of course also other options, which are well-known by a person skilled in the art, such as multi-stranded wire types. As may be seen in FIG. 1 the boundary wire 4 makes a loop 4*a* in the charging station 11. This loop 4*a* will be used to guide the robotic mower 2 into charging contact with the charging station 11, which will be described further below.

The system also comprises the charging station 11 mentioned above. The charging station itself 11 may be seen as the place where the charging of the robotic mower 2 takes place, and could for an example be provided with a charging station plate 24 onto which the robotic mower 2 is guided when performing docketing. A charging station plate 24 will make the docketing process more precise, since the robotic mower 2 will be at an even and predictable ground during the docketing process. In order to identify where the charging station 11 is located, there is provided a charging station loop 10 at the charging station 11. As shown in FIG. 1 the boundary wire loop 4*a* is narrower than and (optionally) crosses the charging station loop 10.

A system according to the present disclosure also comprises one or more guide wires 8. A guide wire 8 is a wire that the robotic mower 2 may follow when returning to the charging station 11 and/or to move along a way that is otherwise difficult to find. The robotic mower may also be adapted to follow the boundary wire 4 back to the charging station 11. However, depending on the location along the boundary wire 4 at which the robotic mower 2 starts to follow the boundary wire 4, the distance along the boundary wire 4 to the charging station 11 may be relatively long. By using a guide wire 8 it is possible to return the robotic mower 2 to the charging station 11 in a faster and less energy consuming way.

The boundary wire 4, the charging station loop 10 and the one or more guide wires 8 are all connected to a signal generator which feeds each wire and loop with a (particularly wire-specific) current signal, in particular an Alternating Current, AC, signal, such that the robotic mower 2 may recognize which wire or loop it is detecting when it is within sensing distance. In general, the robotic mower 2 may be adapted to detect magnetic fields of the different signal wires.

Figure 2:
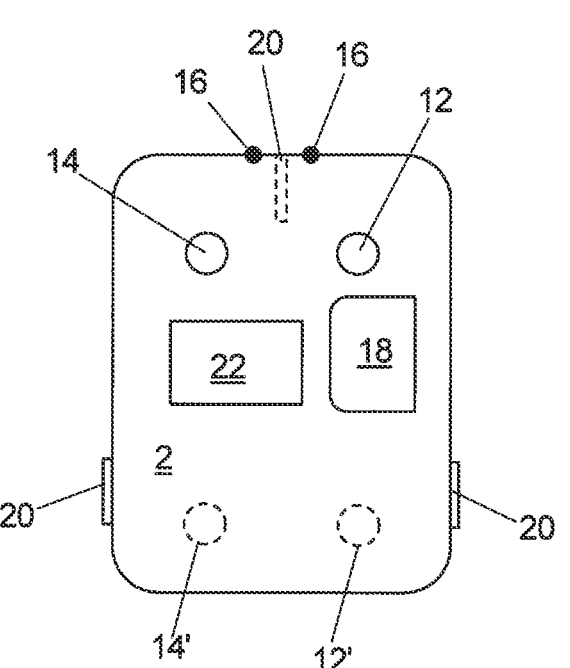
FIG. 2 is a schematic view of an exemplary embodiment of the robotic mower.

Turning now to FIG. 2, an exemplary embodiment of the robotic mower 2 will be closer described. The robotic mower 2 comprises a control unit 22, wheels 20, at least one sensor 12, 14, in particular two sensors 12, 14, optionally three or four sensors 12, 14, 12', 14', e.g., two sensors 12, 14 at the front and one or two sensors 12', 14' at the back, and a battery 18. The sensors 12, 14, 12', 14' (in the following referred to as sensors 12, 14 for brevity) each are adapted to sense magnetic fields. The control unit 22, which will be closer described in conjunction with FIG. 4, comprises among other things a processor 80 for controlling the movement of the robotic mower 2. When the robotic mower 2 is in operation the sensors 12, 14 can sense a magnetic field that is generated in the boundary wire 4, the charging station loop 10 and the one or several guide wires 8. The signals of the different wires 4, 8 may be encoded differently. The sensed magnetic field (signal) is decoded in the control unit 22 to determine from which loop or wire it was received. The robotic mower 2 further comprises charging connectors 16. In the present example, the robotic mower 2 comprises exactly two sensors 12, 14 but, as said, in alternative embodiments the robotic mower 2 may comprise more than two, e.g., three or four sensors.

It is worth noting that the robotic mower 2 has a forward-rearward axis along which the robotic mower 2 moves when it drives straight ahead or straight backwards. In the present example, the robotic mower 2 has a longitudinal extension in accordance with the forward-rearward axis. The two sensors 12, 14 are arranged displaced to one another in a direction orthogonal to the forward-rearward axis. In this example, the sensors 12, 14 are arranged in a front region of the robotic mower 2 and could be referred to as front sensors 12, 14 (two rear sensors 12', 14' are optionally provided at the rear of the robotic mower 2 and arranged displaced to one another in a direction orthogonal to the forward-rearward axis).

Figure 3:
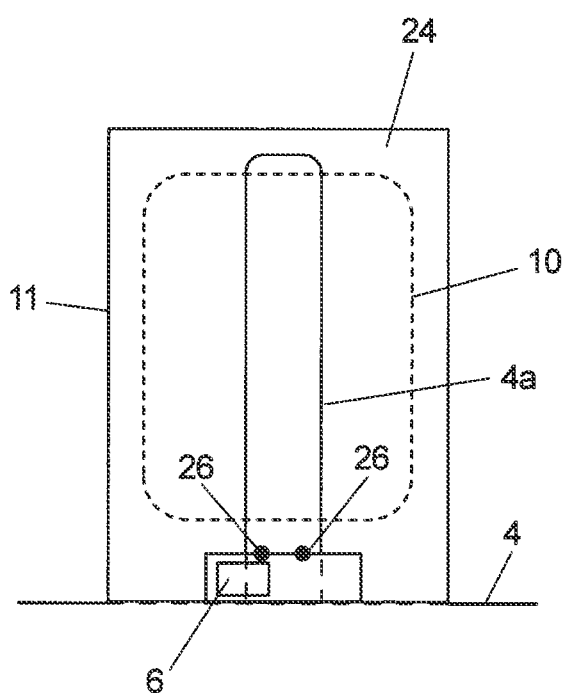
FIG. 3 is a schematic view of an exemplary embodiment of a charging station of the robotic mower system.

FIG. 3 shows an exemplary embodiment of the charging station 11. The charging station 11 comprises the charging station plate 24 at which the charging station loop 10 (which can also be referred to as far-field loop) and the boundary wire loop 4*a* (which may also be referred to as near-field loop) are arranged. The charging station 11 further comprises the signal generator 6. As shown in FIG. 3, the charging station 11 comprises charging connectors 26 which are arranged so as to be contacted by the charging connectors 16 of the robotic mower 2 when docking into the charging station 11.

Figure 4:
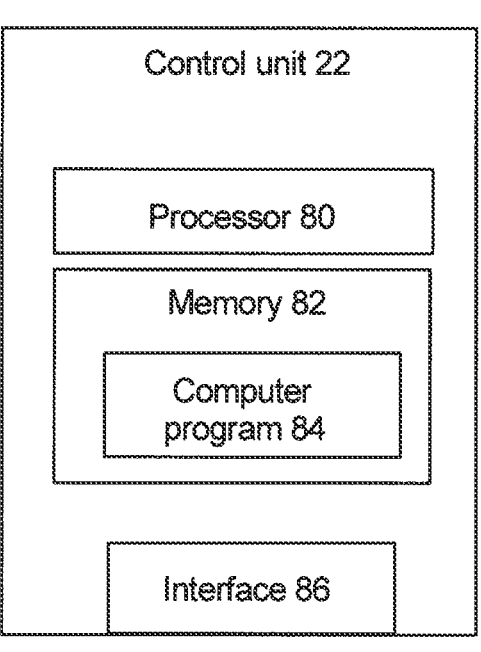
FIG. 4 is a schematic block diagram of a control unit in the robotic mower.

With reference to FIG. 4, the control unit 22 of the robotic mower 2 will be closer described. The control unit 22 comprises, as mentioned above, the processor 80 and a memory 82. The memory 82 may comprise a computer program 84 comprising computer program code, i.e. instructions. The computer program code is adapted to implement method steps performed by the robotic mower 2 when the code is executed on the processor 80. The control unit 22 further comprises an interface 86 for communication with the sensors 12, 14, and one or more motors that operate(s) the robotic mower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 5:
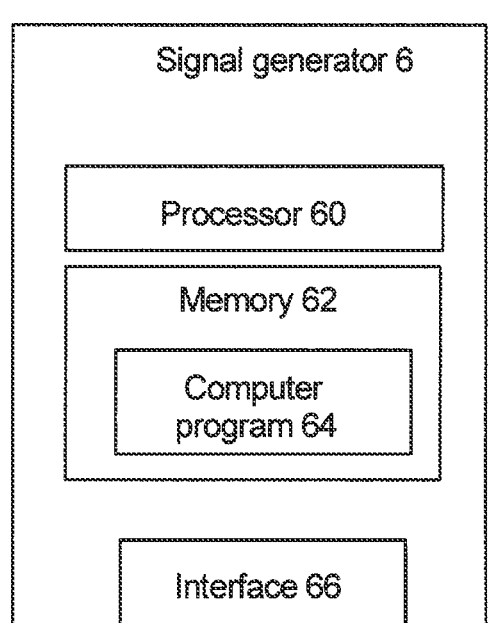
FIG. 5 is a schematic block diagram of a signal generator.

FIG. 5 depicts the signal generator 6, which also comprises a processor 60 and a memory 62. The memory 62 may comprise a computer program 64 comprising computer program code, i.e. instructions. The computer program code is adapted to implement method steps performed by the signal generator 6 when the code is executed on the processor 60. The signal generator 6 further comprises an interface 66 for transmitting the generated (e.g., AC) signals to the boundary wire 4, charging station loop 10 and guide wire or wires 8.

As for processor 80 also the processor 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Turning now to FIG. 6A to FIG. 6J an exemplary embodiment will be closer described.

Firstly, a command is triggered, indicating that the robotic mower 2 shall navigate towards a predetermined position, in the present example the charging station 11. The command may be triggered by the signal generator 6, or by the control unit 22. The robotic mower 2 then starts to search for the guide wire 8. For finding the guide wire 8, the robotic mower 2 drives across the area A and the sensors 12, 14 are used to listen for guide wire 8 signals. The guide wire 8 signals have a range, e.g. of several meters, within which the sensors 12, 14 can sense the signals. As soon as one or both of the sensors 12, 14 receive the guide wire 8 signals, the robotic mower 2 is commanded to drive to the guide wire 8, e.g., simply by continuing to drive straight until the robotic mower 2 crosses the guide wire 8.

To create the guide wire 8 signals, the signal generator 6 directs current through the guide wire 8 which creates a magnetic field around the guide wire 8 having a polarity. Thus, on one side of the guide wire 8, the polarity of the guide wire 8 signal is opposite to the polarity at the other side of the guide wire 8. As soon as the robotic mower 2 crosses the guide wire 8, one or both of the sensors 12, 14 detect a change of the polarity. By detecting this change, the robotic mower 2, more precisely, its control unit 22, is configured to determine that it crosses the guide wire 8.

Figure 6A:
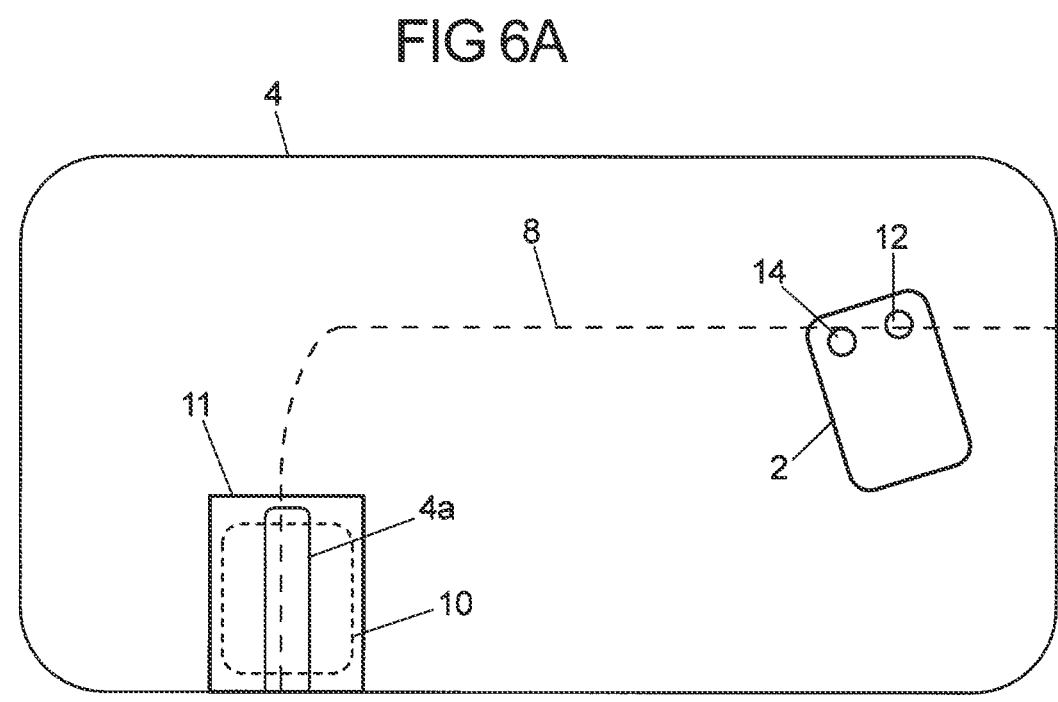
FIG. 6A to FIG. 6J show different steps when the robotic mower navigates along a guide wire of the robotic mower system.

FIG. 6A shows a situation where the robotic mower 2 detects the guide wire 8. A first sensor 12 of the sensors 12, 14 has crossed the guide wire 8 while the other has not, so the robotic mower 2 can deduce that it is located directly above the guide wire 8.

In the present example, the robotic mower 2 arrived at the guide wire 8 at an angle, and in the situation shown in FIG. 6A, the first sensor 12 has crossed the guide wire 8 while the other, second sensor 14 of the sensors 12, 14 has not yet crossed it. By measuring the guide wire 8 signal polarity with the sensors 12, 14, the robotic mower 2 determines that it is directly above the guide wire 8. When the robotic mower 2 would arrive at the guide wide 8 orthogonally thereto, both sensors 12, 14 would detect a switch of the polarity at the same time, so the robotic mower 2 could deduce that it is directly above the guide wire 8 in that situation.

Further, the guide wire 8 is electrically connected to the signal generator 6 with one end, and to the boundary wire 4 with another end, wherein the boundary wire is connected to the signal generator 6. By determining the polarity of the guide wire 8 signals, the robotic mower 2 is able to deduce on which side of the guide wire 8 the corresponding sensor 12, 14 is located. Further, depending on whether both sensors are left or right of the guide wire 8, or one is left and the other is right (or vice versa) the robotic mower 2 can deduce whether it is oriented along the guide wire 8 towards the charging station 11 or away from the charging station 11, or facing left or right with respect to the guide wire 8. Thus, by a simple and very robust measurement of two polarity signals, the robotic mower 2 can quickly and reliably determine its current orientation with respect to the guide wire 8 and the charging station 11.

Figure 6B:
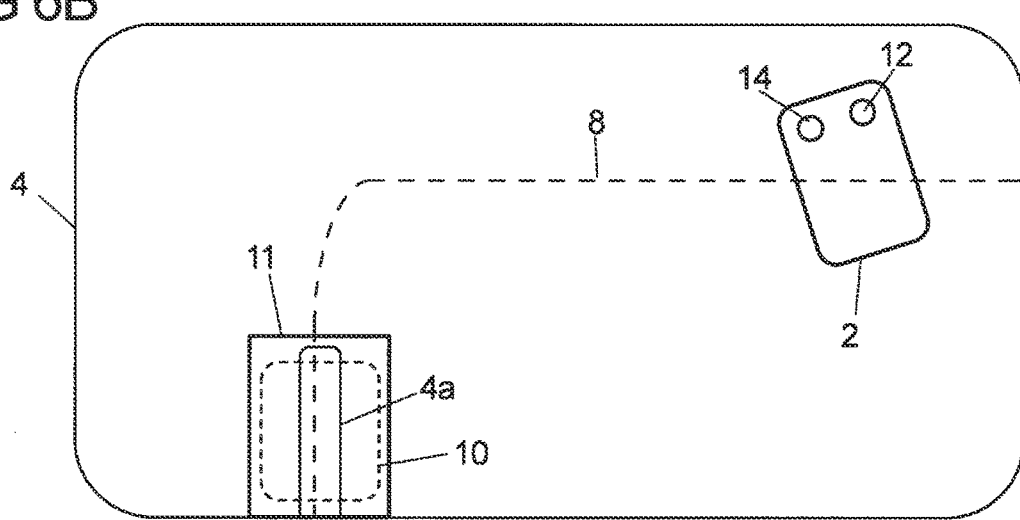

As shown in FIG. 6B, in response to detecting that it is located above the guide wire 8, the robotic mower 2 is adapted to drive further (in particular, straight ahead) across the guide wire 8 for a predefined distance. The predefined distance may be the length of the mower or a fraction thereof, or the turning radius of the robotic mower 2 or a fraction thereof. After driving the predefined distance, both sensors 12, 14 are arranged at the same side of the guide wire 8. Based on the guide wire 8 signal polarity, the robotic mower 2 determines the direction (along the guide wire 8) to the charging station 11. Next, the robotic mower 2 turns left or right towards this determined direction of the charging station 11. While rotating relative to the guide wire 8, the robotic mower 2 analyzes the guide wire 8 signal polarity.

As soon as one of the sensors 12, 14, in the figures, the left, second sensor 14, detects a change of the polarity, the robotic mower 2 determines that the guide wire 8 is substantially aligned with the robotic mower 2, in the present example, aligned with the forward-rearward axis of the robotic mower 2.

In other words, the robotic mower 2 may use two front sensors 12, 14 to determine in which direction to follow the guide wire 8 in order to reach the charging station 11. Depending on the polarity of the signal from the guide wire 8, the robotic mower 2 can distinguish if the charging station 11 is located behind, to the left, to the right or in front of the robotic mower 2. The alignment towards the charging station 11 can be used as a trigger point for when to start following the guide wire 8. Further, different actions can be taken by the robotic mower 2 to optimize the alignment process using this information, such as turning different angles and/or turning with different speeds (e.g., turning with a speed and/or by an angle depending on the determined direction). Further, a fault detection after crossing the guide wire 8 may be provided. For example, if the alignment is undefined, the robotic mower 2 can abort the alignment procedure and restart a new search for the guide wire 8 immediately, instead of trying for some time to figure out a solution or trying to locate the guide wire 8. For comparison, a conventional robotic mower would have to turn large angles until a front sensor crosses the wire again to determine its relative position to the wire. The reason for the large angles is because of an inherent risk of slipping on the grass, and therefore the mower may continue to turn until finally giving up. The methods described herein allow to perform calculated actions, thus reducing unnecessary search time and therefore improving battery life.

Figure 6C:
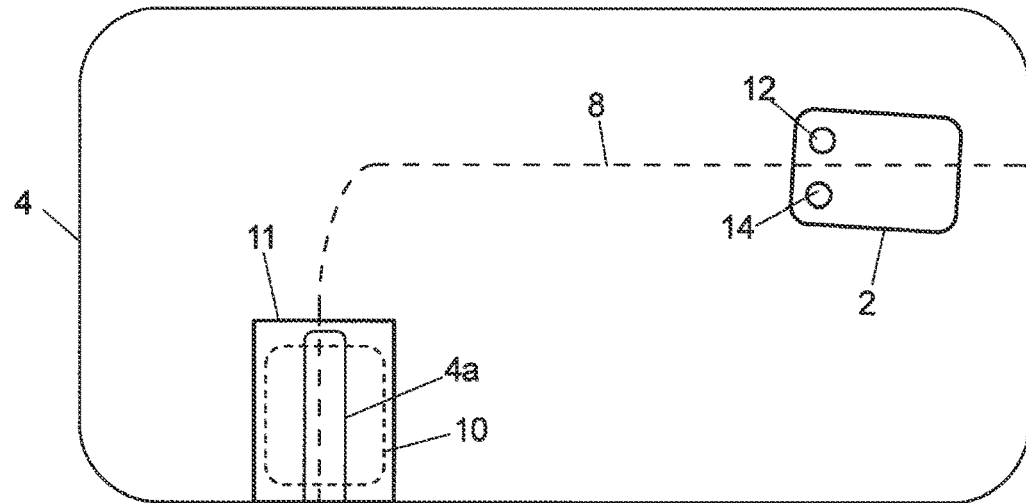

FIG. 6C shows the robotic mower 2 after aligning with the guide wire 8. The robotic mower 2 now faces the direction along the guide wire 8 towards the charging station 11.

Figure 6D:
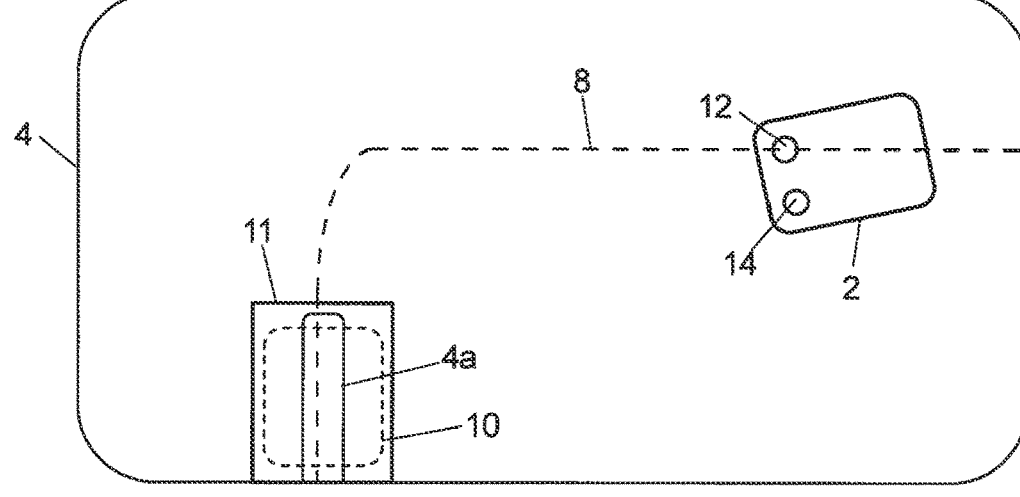

Next, as shown in FIG. 6D, the robotic mower 2 navigates, by means of the sensors 12, 14 detecting signal of the guide wire 8, such that one sensor (here, the first, right-hand side sensor 12) is located directly above the guide wire 8.

Then, the robotic mower 2 starts to straddle the guide wire 8 with one of the sensors 12, 14 directly above the guide wire 8 towards the charging station 11. In the present example, this is the right-hand side sensor 12. The other sensor 14 (here, as an example, the left-hand side sensor) is the one outside the guide loop, which in the figures is below the guide wire 8. While straddling along the guide wire 8, the robotic mower 2 maintains the same distance to the guide wire 8.

Figure 6E:
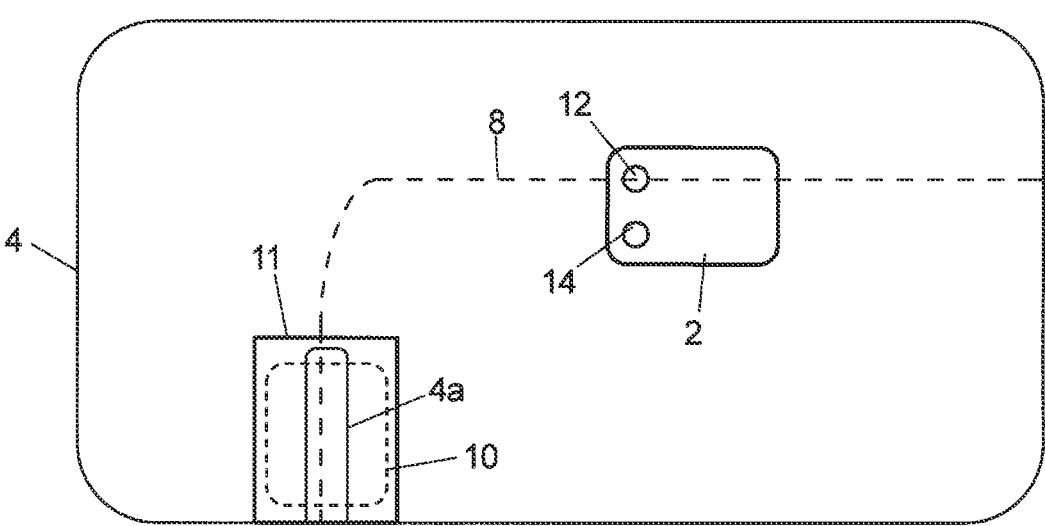
Figure 6F:
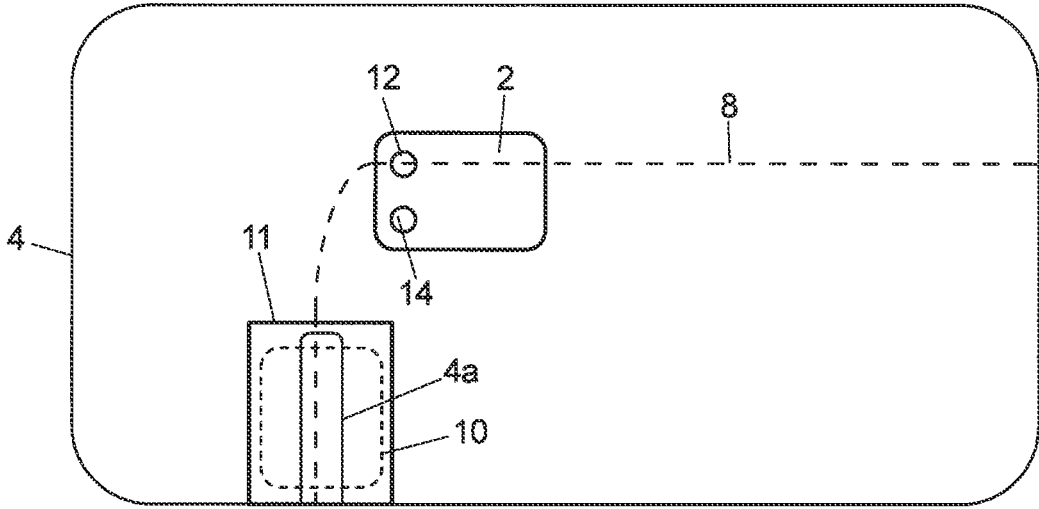
Figure 6G:
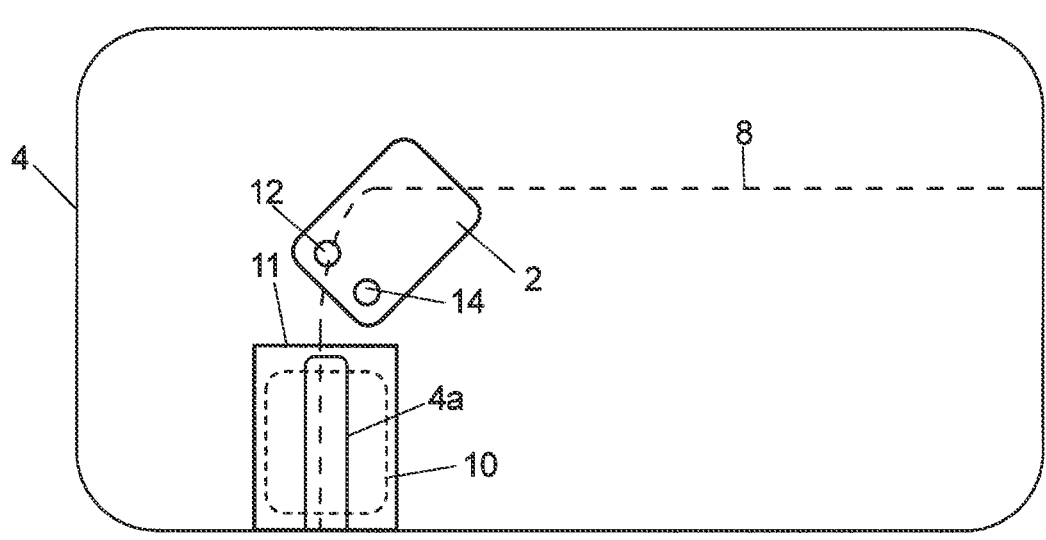

FIGS. 6E, 6F and 6G show the robotic mower 2 after straddling along the guide wire 8 portions of its way to the charging station 11.

Figure 6H:
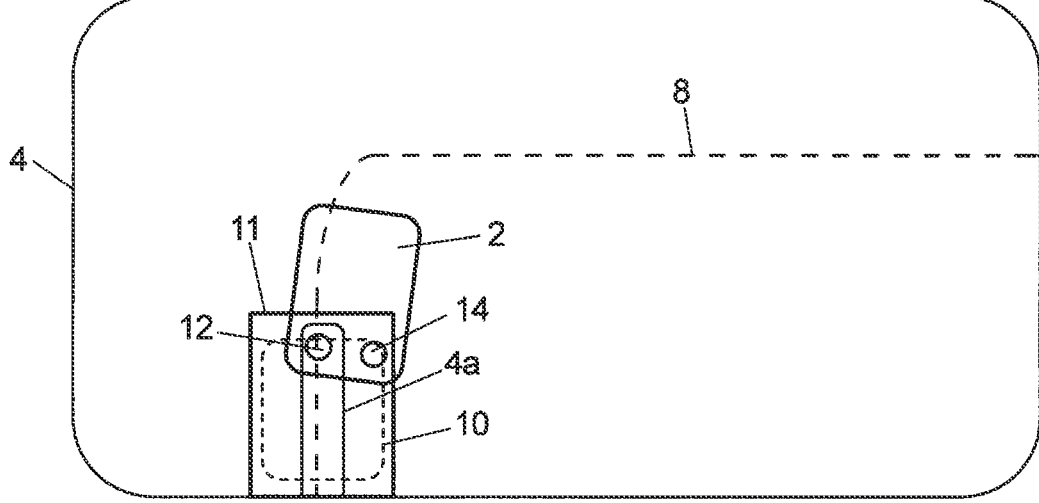

Next, the robotic mower 2 detects that one or both of the sensors 12, 14 has/have entered the charging station loop 10 by detecting a change of the measured charging station loop 10 signal polarity, see FIG. 6H.

In response to detecting entering of the charging station loop 10, the robotic mower 2 continues to drive straight forward for a predetermined distance.

Next, the robotic mower 2 localizes itself in relation to the near-field loop (boundary wire loop 4a). The boundary wire loop 4a is a fixed part of the boundary wire 4 and contains the same signal as the boundary wire 4. In order to determine its orientation in relation to the boundary wire loop 4a, the robotic mower 2 turns until one of the front sensors 12, 14 enters the boundary wire loop 4a. When one of the front sensors 12, 14 enters the boundary wire loop 4a or is already inside the boundary wire loop 4a, the robotic mower 2 continues to turn until the trailing sensor 12, 14 (if one sensor 12, 14 enters the boundary wire loop 4a first, the trailing sensor is the other one of the sensors 12, 14) also enters the boundary wire loop 4a.

The near-field alignment which the robotic mower 2 is configured to perform may also include fault handling to detect if the robotic mower 2 is initially turning in the wrong direction, by, for example, using a maximum turning angle without detecting the boundary wire loop 4a with any of the front sensors 12, 14 before turbine in the other direction. This fault detection is only used if no loop signal would be inside the boundary wire loop 4a before the initial turning. If a sensor 12, 14 is inside of the boundary wire loop 4a, the robotic mower 2 can deduce which direction to turn.

Figure 6I:
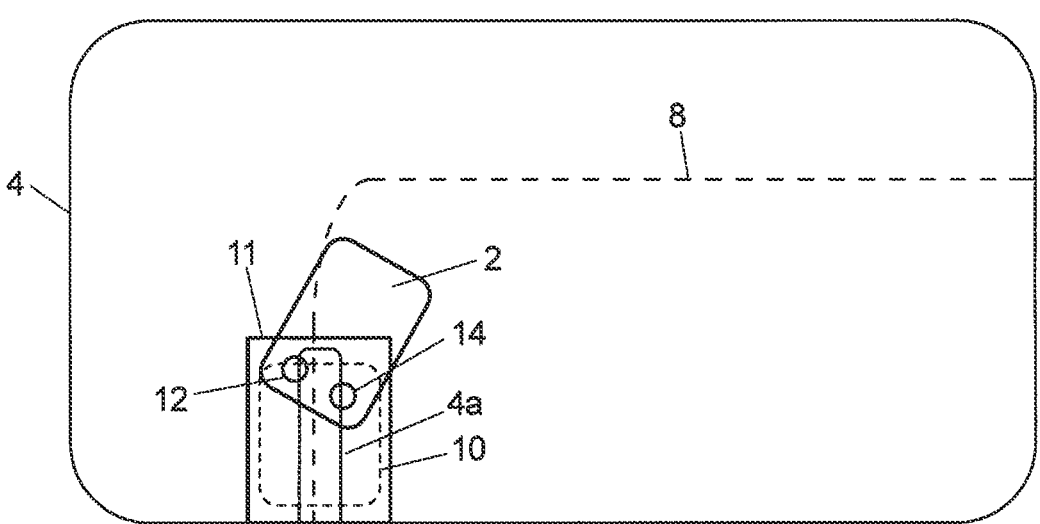

FIG. 6I shows the robotic mower 2 after having initially aligned with the boundary wire loop 4a. Next, the robotic mower 2 continues with the docking procedure. The robotic mower 2 drives (slowly) forward and depending on the sensor 12, 14 information about the boundary wire loop 4a signal (in general, near-field signal) either turns slightly left or right. Optionally, the following procedure is used: (a) if the left sensor 14 is inside the boundary wire loop 4a and the right sensor 12 is outside of the boundary wire loop 4a, the robotic mower 2 turns left, e.g., using a turning velocity (and/or time) that depends on the boundary wire loop 4a signal level measured by the left sensor 14; (b) if the right sensor 12 is inside the boundary wire loop 4a and the left sensor 12 is outside of the boundary wire loop 4a, the robotic mower 2 turns right e.g., using a turning velocity (and/or time) that depends on the boundary wire loop 4a signal level measured by the right sensor 12; (c) if no sensor 12, 14 is inside the boundary wire loop 4a, or both sensors 12, 14 are inside the boundary wire loop 4a, then the robotic mower 2 drives straight forward without turning. Steps (a) to (c) may be performed continuously until the robotic mower 2 reaches the charging position where the charging connectors 16 of the robotic mower 2 make electric contact with the charging connectors 26 of the charging station 11.

Figure 6J:
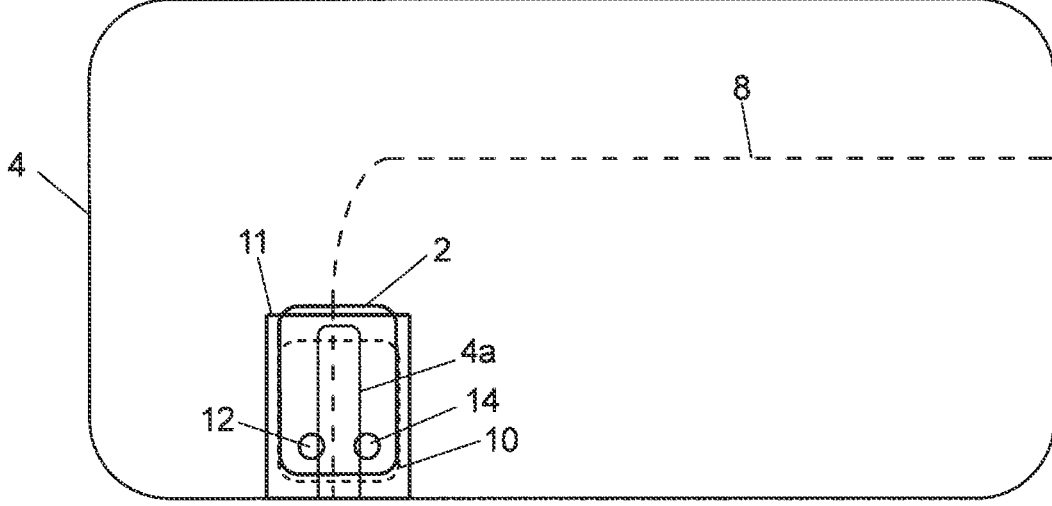

FIG. 6J shows the robotic mower 2 in the charging position.

Figure 7:
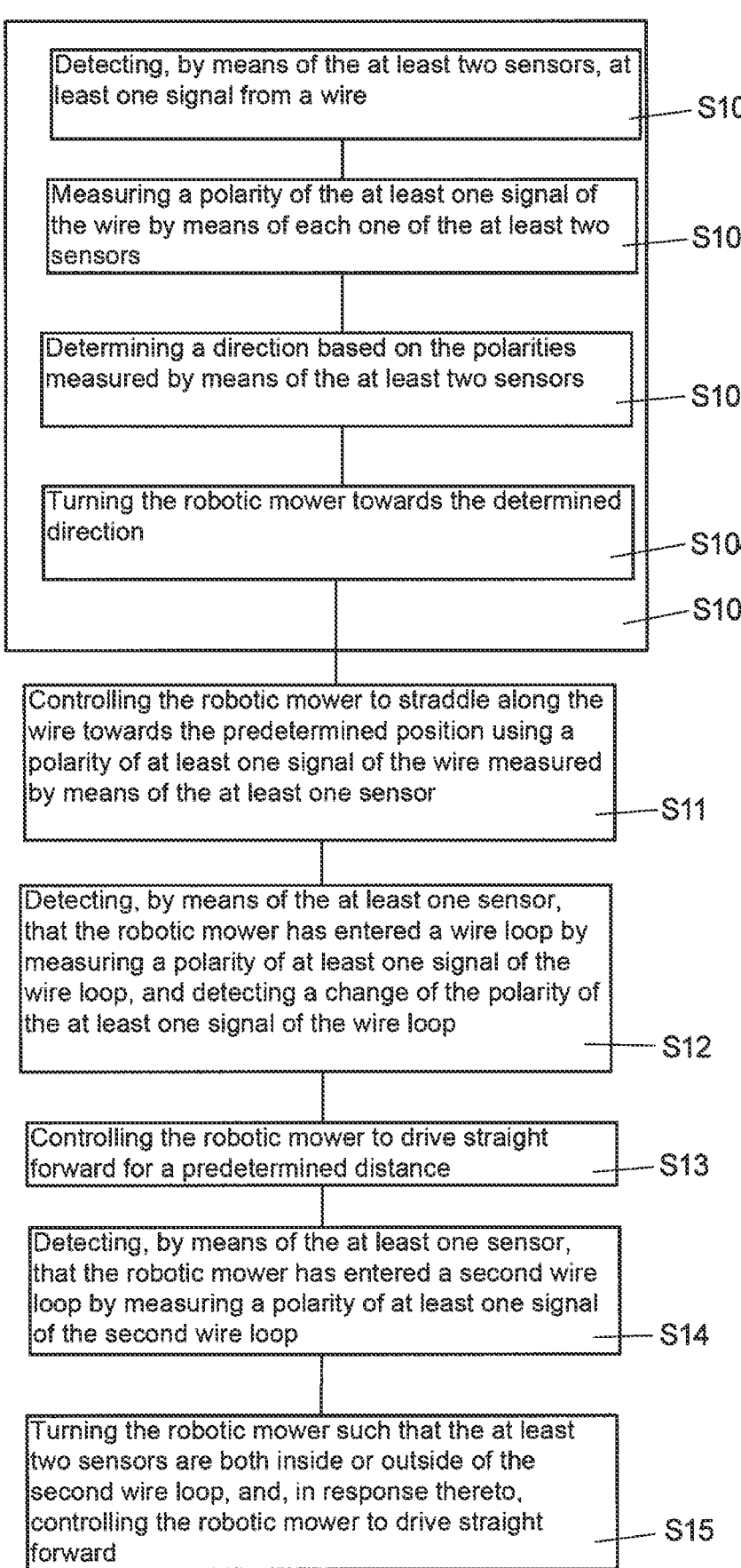
FIG. 7 is a flow chart of an exemplary method for navigating the robotic mower by means of the guide wire.

Turning now to FIG. 7, an exemplary method will now be described. The method starts, e.g., when the robotic mower 2 processes, e.g. receives, a return signal at or from the control unit 22, which commands the robotic mower 2 to return to the charging station 11. This may be triggered by detecting that the power in the battery 18 is lower than a predetermined limit. The predetermined limit is set such that the robotic mower 2 may safely return to the charging station 11 before the battery 18 is empty, even if it happens to be the longest possible way back to the charging station 11.

When the robotic mower 2 has processed the command to return to the charging station 11, it commences with Step S10.

At step S10, the robotic mower 2 navigates, by means of at least two sensors 12, 14 detecting at least one signal of a wire 8, such that the at least one sensor 12, 14 is located above the wire 8. Step S10 comprises the following steps S101 to S104.

At step S101, the control unit 22 detects, using the at least two sensors 12, 14, at least one signal from the wire 8, e.g., guide wire 8. Thus, the control unit 22 determines that the wire or guide wire 8 is close.

Next, at step S102, the control unit 22 measures a polarity of the at least one signal of the wire 8 by means of each one of the at least two sensors 12, 14.

At step S103, the control unit 22 determines a direction based on the polarities measured by means of the at least two sensors 12, 14. For example, the direction may be one among left, right, forward, backward.

Next, at step S104 the control unit 22 controls the robotic mower 2 to turn towards the determined direction (or keep the direction if the determined direction as already assumed). Optionally, the method terminates after step S104, or continues otherwise, e.g., with step S11.

At step S11, the control unit 22 controls the robotic mower 2 to drive along the wire 8 towards the predetermined position using a polarity of at least one signal of the wire 8 measured by means of at least one sensor 12, 14.

Next, at step S12, the control system 22 detects, by means of the at least one sensor 12, 14, that the robotic mower 2 has entered a wire loop 10 by measuring a polarity of at least one signal of the wire loop 10 and detecting a change of the polarity of the at least one signal of the wire loop 10.

At subsequent, optional step S13, the control system 22 controls the robotic mower 2 to drive straight forward for a predetermined distance.

The wire loop 10 is a first wire loop 10. At step S14 and in response to detecting that the robotic mower 2 has entered the first wire loop 10, the control system 22 detects, by means of the at least one sensor 12, 14, that the robotic mower 2 has entered a second wire loop 4a by measuring a polarity of at least one signal of the second wire loop 4a.

In response to detecting that the robotic mower 2 has entered the second wire loop 4a, at step S15, the control system 22 controls the robotic mower 2 to turn such that the at least two sensors 12, 14 are both inside or outside of the second wire loop 4a, and optionally, in response thereto, controls the robotic mower 2 to drive straight forward. This process may be repeated until the robotic mower 2 assumes the charging position.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

LIST OF REFERENCE NUMERALS

2 robotic mower
4 boundary wire
4a boundary wire loop (second wire loop)
6 signal generator
8 guide wire
10 charging station loop (first wire loop)
11 charging station
12, 12' sensor
14, 14' sensor
16 charging connector
18 battery
20 wheel 22 control unit
24 charging station plate
26 charging connector
60 processor
62 memory
64 computer program
80 processor
82 memory
84 computer program
A area

The invention claimed is:

1. A method for navigating a robotic mower (2) by a wire (4a; 8; 10), said robotic mower (2) comprising at least two sensors (12; 14), the method comprising:

detecting (S101), by at least two sensors (12, 14), at least one signal from the wire (4a; 8; 10), the wire including a boundary wire loop (4a), a charging station loop (10) and one or several guide wires (8), the sensors (12, 14) configured to sense a magnetic field generated in the boundary wire loop (4a), the charging station loop (10) and the one or several guide wires (8);

measuring (S102) a polarity of the at least one signal of the wire (4a; 8; 10) by each one of the at least two sensors (12, 14), determining (S103) a direction based on the polarities measured by the at least two sensors (12, 14) and turning (S104) the robotic mower (2) towards the determined direction;

wherein, signals of the different wires (4a, 8, 10) are encoded differently, the sensed magnetic field is decoded in a control unit (22) to determine from which loop or wire the sensed magnetic field is received.

2. The method according to claim 1, wherein turning (S104) the robotic mower (2) towards the determined direction comprises rotating the robotic mower (2) with respect to the wire (8) such that one of the at least two sensors (12, 14) is located above the wire (8).

3. The method according to claim 2, wherein turning (S104) the robotic mower (2) towards the determined direction comprises rotating the robotic mower (2) with respect to the wire (4a; 8; 10) until one of the at least two sensors (12, 14) detects a change of the polarity of the at least one signal of the wire (4a; 8; 10).

4. The method according to any of claim 3, wherein turning (S104) the robotic mower (2) towards the determined direction comprises rotating the robotic mower (2) with respect to the wire (4a; 8; 10) until the at least two sensors (12, 14) detect the at least one signal of the wire (4a; 8; 10) with opposite polarity.

5. The method according to any of claim 4, further comprising crossing the wire (8; 10) by a predetermined crossing distance before measuring the polarity of the at least one signal of the wire (8; 10) by each one of the at least two sensors (12, 14).

6. The method according to any of claim 5, wherein the wire (8) is a guide wire (8) arranged within an area (A) delimited by a boundary wire (4).

7. The method according to any of claim 5, wherein the wire (4a; 10) is a wire loop arranged at a charging station plate (24) of a charging station (11).

8. The method according to claim 1, wherein a boundary wire (4) configured to delimit a working area within which the robotic mower is allowed to move and configured to make the boundary wire loop (4a), the boundary wire loop (4a) is a circle loop in the working area and in a charging station (11) and configured to guide the robotic mower (2) into charging contact with the charging station (11), the guide wire (8) is a single wire that the robotic mower (2) follows when returning to the charging station (11) and/or to move along a way that is otherwise difficult to find, and configured to be guide the robotic mower (2) when the robotic mower (2) returns to the charging station and/or to moves along a way that is otherwise difficult to find, the charging station loop (10) is a circle loop and provided by the charging station (11) and in charging station (11), the boundary wire loop (4a) is narrower than and crosses the charging station loop (10) to define a predetermined position in the charging station.

9. A method for guiding a robotic mower (2) along a wire (4a, 8, 10) to a predetermined position, said robotic mower (2) comprising at least one sensor (12; 14), the method comprising:

navigating (S10) the robotic mower (2), by the at least one sensor (12, 14) detecting at least one signal of the wire (4a, 8, 10), such that the at least one sensor (12, 14) is located above the wire (4a, 8, 10) and controlling (S11) the robotic mower (2) to straddle along the wire (4a, 8, 10) towards the predetermined position using a polarity of at least one signal of the wire (4a, 8, 10) measured by the at least one sensor (12, 14); wherein, the wire (4a, 8, 10) includes a boundary wire loop (4a), a charging station loop (10) and one or several guide wires (8), the sensors (12, 14) are configured to sense a magnetic field generated in the boundary wire loop (4a), the charging station loop (10) and the one or several guide wires (8); the charging station loop (10) is a first wire loop (10), the boundary wire loop (4a) is a second wire loop (4a), both the first wire loop (10) and the second wire loop (4a) are in a charging station (11) and cross with each other to define the predetermined position in the charging station (11);

controlling (S11) the robotic mower (2) to straddle along the wire (4a, 8, 10) towards the predetermined position using a polarity of at least one signal of the wire (4a, 8, 10) measured by the at least one sensor (12, 14) further comprising: detecting (S12), by the at least one sensor (12, 14), that the robotic mower (2) has entered the first wire loop (10) by measuring a polarity of at least one signal of the first wire loop (10), detecting a change of the polarity of the at least one signal of the first wire loop (10), and in response to detecting that the robotic mower (2) has entered the first wire loop (10), detecting (S14), by the at least one sensor (12, 14), that the robotic mower (2) has entered the second wire loop (4a) by measuring a polarity of at least one signal of the second wire loop (4a), so that the robotic mower returns to the predetermined position in the charging station;

signals of the different wires (4a, 8, 10) are encoded differently, and the sensed magnetic field is decoded in a control unit (22) to determine from which loop or wire the sensed magnetic field is received.

10. The method according to claim 8, further comprising, in response to detecting that the robotic mower (2) has entered the wire loop (10), controlling (S13) the robotic mower (2) to drive straight forward for a predetermined distance.

11. The method according to claim 9, wherein the robotic mower (2) comprises at least two sensors (12, 14), the method further comprising, in response to detecting that the robotic mower (2) has entered the second wire loop (4a), turning (S15) the robotic mower (2) such that the at least two sensors (12, 14) are both inside or both outside of the second wire loop (4a), and, in response thereto, controlling the robotic mower (2) to drive straight forward.

12. The method according to claim 11, wherein the second wire loop (4a) is a portion of, or electrically connected with, a boundary wire (4) delimiting an area (A).

13. The method according to claim 12, wherein the wire (8) is a guide wire (8) arranged within the area (A) delimited by the boundary wire (4).

14. A robotic mower (2) comprising at least two sensors (12; 14, and adapted to:
    detect, by at least two sensors (12, 14), at least one signal from a wire (4a; 8; 10),
    measure a polarity of the at least one signal of the wire by each one of the at least two sensors (12, 14),
    determine a direction based on the polarities measured by the at least two sensors (12, 14) and
    turn towards the determined direction;
    wherein, the wire (4a, 8, 10) includes a boundary wire loop (4a), a charging station loop (10) and one or several guide wires (8), the sensors (12, 14) are configured to sense a magnetic field generated in the boundary wire loop (4a), the charging station loop (10) and the one or several guide wires (8);
    wherein signals of the different wires (4a, 8, 10) are encoded differently, and the sensed magnetic field is decoded in a control unit (22) to determine from which loop or wire the sensed magnetic field is received.

15. The robotic mower (2) according to claim 14, adapted to perform a method for navigating a robotic mower (2) by a wire (4a; 8; 10), said robotic mower (2) comprising at least two sensors (12; 14), the method comprising:
    detecting (S101), by at least two sensors (12, 14), at least one signal from the wire (4a; 8; 10),
    measuring (S102) a polarity of the at least one signal of the wire (4a; 8; 10) by each one of the at least two sensors (12, 14),
    determining (S103) a direction based on the polarities measured by the at least two sensors (12, 14) and
    turning (S104) the robotic mower (2) towards the determined direction.

16. A system comprising a wire (4a, 8, 10) and the robotic mower (2) according to claim 14.

17. A robotic mower (2) comprising at least one sensor (12; 14, and adapted to:
    navigate, by the at least one sensor (12, 14) detecting at least one signal of a wire (4a, 8, 10), such that the at least one sensor (12, 14) is located above the wire (4a, 8, 10) and straddle along the wire (4a, 8, 10) towards a predetermined position using a polarity of at least one signal of the wire (4a, 8, 10) measured by the at least one sensor (12, 14); wherein, the wire (4a, 8, 10) includes a boundary wire loop (4a), a charging station loop (10) and one or several guide wires (8), the sensors (12, 14) are configured to sense a magnetic field generated in the boundary wire loop (4a), the charging station loop (10) and the one or several guide wires (8); the charging station loop (10) is a first wire loop (10), the boundary wire loop (4a) is a second wire loop (4a), both the first wire loop (10) and the second wire loop (4a) are in a charging station (11) and cross with each other to define the predetermined position in the charging station (11);

controlling (S11) the robotic mower (2) to straddle along the wire (4a, 8, 10) towards the predetermined position using a polarity of at least one signal of the wire (4a, 8, 10) measured by the at least one sensor (12, 14) further comprising: detecting (S12), by the at least one sensor (12, 14), that the robotic mower (2) has entered the first wire loop (10) by measuring a polarity of at least one signal of the first wire loop (10), detecting a change of the polarity of the at least one signal of the first wire loop (10), and in response to detecting that the robotic mower (2) has entered the first wire loop (10), detecting (S14), by the at least one sensor (12, 14), that the robotic mower (2) has entered the second wire loop (4a) by measuring a polarity of at least one signal of the second wire loop (4a);

signals of the different wires (4a, 8, 10) are encoded differently, and the sensed magnetic field is decoded in a control unit (22) to determine from which loop or wire the sensed magnetic field is received.

18. The robotic mower (2) according to claim 17, adapted to perform a method for navigating a robotic mower (2) by a wire (4a; 8; 10), said robotic mower (2) comprising at least two sensors (12; 14), the method comprising:

detecting (S101), by at least two sensors (12, 14), at least one signal from the wire (4a; 8; 10), measuring (S102) a polarity of the at least one signal of the wire (4a; 8; 10) by each one of the at least two sensors (12, 14), determining (S103) a direction based on the polarities measured by the at least two sensors (12, 14) and turning (S104) the robotic mower (2) towards the determined direction.

19. A system comprising a wire (4a, 8, 10) and the robotic mower (2) according to claim 17.

* * * * *